(12) United States Patent
Rauma (10) Patent No.: US 11,183,916 B2
(45) Date of Patent: Nov. 23, 2021

(54) LINEAR ELECTRIC MACHINE AND A POWER ELECTRONIC CONVERTER FOR CONTROLLING THE LINEAR ELECTRIC MACHINE

(71) Applicant: Danfoss Editron Oy, Lappeenranta (FI)

(72) Inventor: Kimmo Rauma, Lappeenranta (FI)

(73) Assignee: Danfoss Editron Oy, Lappeenranta (FI)

(*) Notice: Subject to any disclaimer, the term of this patent is extended or adjusted under 35 U.S.C. 154(b) by 300 days.

(21) Appl. No.: 16/334,903

(22) PCT Filed: Oct. 25, 2017

(86) PCT No.: PCT/EP2017/077230
§ 371 (c)(1),
(2) Date: Mar. 20, 2019

(87) PCT Pub. No.: WO2018/077916
PCT Pub. Date: May 3, 2018

(65) Prior Publication Data
US 2019/0214896 A1 Jul. 11, 2019

(30) Foreign Application Priority Data
Oct. 28, 2016 (EP) ..................................... 16196217

(51) Int. Cl.
*H02K 41/02* (2006.01)
*H02K 41/03* (2006.01)
(Continued)

(52) U.S. Cl.
CPC ............... *H02K 41/02* (2013.01); *H02K 3/04* (2013.01); *H02K 11/33* (2016.01); *H02K 41/03* (2013.01); *H02K 2201/03* (2013.01)

(58) Field of Classification Search
CPC .... H02K 41/031; H02K 41/035; H02K 41/02; H02K 41/03; H02K 41/00; H02K 41/025;
(Continued)

(56) References Cited

U.S. PATENT DOCUMENTS 4,463,290 A 7/1984 Asakawa et al.
6,305,501 B1 * 10/2001 Kahkipuro .......... B66B 11/0407
187/250
(Continued)

FOREIGN PATENT DOCUMENTS

CN 102255470 A * 11/2011
CN 102255470 A 11/2011
(Continued)

OTHER PUBLICATIONS

Binchao et al., Linear Permanent Magnet Synchronous Motor with Low Thrust Fluctuation, Nov. 23, 2011, Harbin Inst of Technolgy, CN 102255470 (English Machine Translation) (Year: 2011).*
(Continued)

*Primary Examiner* — Quyen P Leung
*Assistant Examiner* — Alexander A Singh
(74) *Attorney, Agent, or Firm* — McCormick, Paulding & Huber PLLC (57) ABSTRACT

A linear electric machine comprises a primary part (101) and a secondary part (102) linearly movable with respect to each other. The primary part comprises primary sections (103, 104) each having an airgap surface. The secondary part comprises secondary sections (105, 106) each having an airgap surface facing towards the air-gap surface of the respective primary section. Each primary section comprises force-generating windings (U1, V1, W1, U2, V2, W2) for generating a magnetic thrust force and a transversal magnetic force pulling the primary section towards the respective secondary section. The resultant of the transversal
(Continued)

magnetic forces is controllable to levitate the primary part. The primary part further comprises one or more tilt-control windings (T1, T2) for controlling tilting of the primary part with respect to the secondary part.

20 Claims, 5 Drawing Sheets

(51) Int. Cl.
  *H02K 11/33* (2016.01)
  *H02K 3/04* (2006.01)
(58) Field of Classification Search
  CPC ........... H02K 41/0352; H02K 41/0354; H02K 41/0356; H02K 19/103; H02K 11/33; H02K 3/04; H02K 2201/03; B66B 11/0407; B23D 47/042
  USPC ......... 310/12.01, 12.02, 12.03, 12.05, 12.06, 310/12.07, 12.08, 12.09, 12.11, 12.12, 310/12.16, 12.17, 12.18, 12.19, 12.21, 310/12.22, 12.24, 12.26, 49.01, 90.5
  See application file for complete search history.

(56) References Cited

U.S. PATENT DOCUMENTS

| | | | | |
|---|---|---|---|---|
| 2008/0265689 | A1* | 10/2008 | Armeit | B23D 47/04 310/12.19 |
| 2009/0302786 | A1* | 12/2009 | Kim | H02K 41/03 318/135 |
| 2012/0262095 | A1* | 10/2012 | Smith | H02K 41/031 318/135 |
| 2016/0268883 | A1* | 9/2016 | Kakihara | H02K 41/033 |
| 2018/0003224 | A1 | 1/2018 | Hitachi | |

FOREIGN PATENT DOCUMENTS

| | | |
|---|---|---|
| DE | 102005004380 A1 | 8/2006 |
| DE | 102005007489 A1 | 8/2006 |
| EP | 2131477 A2 | 12/2009 |
| JP | 2002504880 A | 2/2002 |
| JP | 2005168243 A | 6/2005 |
| JP | 2009296874 A | 12/2009 |
| KR | 100426616 B1 | 4/2004 |
| WO | 9858866 A2 | 12/1989 |
| WO | 9858866 A2 | 12/1998 |
| WO | 2016110948 A1 | 10/2017 |

OTHER PUBLICATIONS

International Search Report For Serial No. PCT/EP2017/077230 dated Nov. 23, 2017.
English Translation of Japanese Office Action dated Aug. 3, 2021.

* cited by examiner

Figure 3

LINEAR ELECTRIC MACHINE AND A POWER ELECTRONIC CONVERTER FOR CONTROLLING THE LINEAR ELECTRIC MACHINE

CROSS-REFERENCE TO RELATED APPLICATIONS

This application is a National Stage application of International Patent Application No. PCT/EP2017/077230, filed on Oct. 25, 2017, which claims priority to European Patent Application No. 16196217.0, filed on Oct. 28, 2016, each of which is hereby incorporated by reference in its entirety.

TECHNICAL FIELD

The disclosure relates to a linear electric machine and to a power electronic converter for controlling a linear electric machine. Furthermore, the disclosure relates to a conveyor system comprising a linear electrical machine and a power electronic converter for controlling the linear electric machine. The conveyor system can be for example an elevator or any other conveyor system where a conveyor car is movable along a vertical, horizontal, or inclined path.

BACKGROUND

A linear electric machine comprises a primary part and a secondary part which are linearly movable with respect to each other. The primary and secondary parts are provided with magnetically operating means for converting electric energy into linear movement between the primary and secondary parts when the linear electric machine operates as a linear motor, and for converting linear movement between the primary and secondary parts into electric energy when the linear electric machine operates as a linear generator. The magnetically operating means may comprise for example multiphase windings for generating a magnetic field moving with respect to the multiphase windings when alternating currents are supplied to the multiphase windings. Furthermore, the magnetically operating means may comprise equipment for generating a thrust force in response to the moving magnetic field generated with the multiphase windings. The above-mentioned equipment may comprise for example permanent magnets, electromagnets, electrically conductive structures, and/or mechanical structures providing a spatial reluctance variation. The multiphase windings can be located in a movable part of a linear electric machine and the equipment for generating a thrust force in response to a moving magnetic field can be located in a static part of the linear electric machine. It is also possible that the multiphase windings are located in the static part and the equipment for generating the thrust force in response to the moving magnetic field is located in the movable part.

In many applications, linear electric machines are combined with magnetic levitation where a movable part of a linear electric machine and mechanical structures connected to the movable part are magnetically levitated. An inconvenience related to many systems comprising a magnetically levitated linear electric machine is the complexity of the system because there are first magnetically operating means for generating a thrust force and second magnetically operating means for levitating the movable part and the mechanical structures connected to it.

Publication EP2131477 describes a linear electric motor that comprises a stator having teeth symmetrically formed on upper and lower surfaces of the stator at regular pitch. The linear electric motor comprises a movable member including upper cores disposed above the stator, lower cores disposed below the stator in symmetrical with the upper cores, and yoke parts connecting the upper and the lower cores around the stator. The upper and lower cores have upper and lower coils wound thereabout, and at least one gap sensor to detect the gap between the stator and the upper or lower core and the inclination of the movable member. A controller performs levitation control by adjusting the amplitudes of currents applied to the upper and lower coils, based on the gap variation, and drives the linear motion by changing the current phases. A multi-channel voltage-to-current power amplifier is connected to each coil of the upper and lower cores.

Publication US2012262095 describes an apparatus that comprises i) a first member supporting a first magnetic flux carrying member, ii) a second member supporting a second magnetic flux generating member and being movable relative to the first member, and iii) an air gap control system coupled to the first member or the second member. The air gap control system comprises an air gap control device configured to exert a force on the first member or on the second member in response to movement of the first member and/or the second member in a direction that reduces a distance between the first member and the second member so as to maintain a minimum distance between the first member and the second member.

SUMMARY

The following presents a simplified summary in order to provide a basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

In accordance with the invention, there is provided a new power electronic converter for controlling a linear electric machine that comprises a primary part and a secondary part which are linearly movable with respect to each other, wherein the primary part comprises primary sections each having an airgap surface, the secondary part comprises secondary sections each having an airgap surface facing towards the air-gap surface of a respective one of the primary sections, each primary section comprises force-generating windings for generating a longitudinal magnetic thrust force tending to move the primary part longitudinally with respect to the secondary part and a transversal magnetic force pulling the primary section towards a respective one of the secondary sections, the primary sections are mechanically connected to each other and the secondary sections are mechanically connected to each other so that the transversal magnetic forces acting on the primary sections are controllable to cancel each other, and the primary part comprises, at least at a first end-region of the primary part, one or more tilt-control windings for generating one or more transversal magnetic tilt-control forces so as to control an angular deviation between a longitudinal direction of the primary part and a longitudinal direction of the secondary part.

A power electronic converter according to the invention comprises:
 a first current supply section for supplying force-generating currents to the force-generating windings of the linear electric machine, a first controller section for controlling the force-generating currents in accordance with control information related to a longitudinal magnetic thrust force to be generated by the linear electric machine, a second controller section for controlling differences of the force-generating currents related to different ones of the primary sections in accordance with position information indicative of a transversal position of the primary part of the linear electric machine with respect to the secondary part of the linear electric machine so as to magnetically levitate the primary part with respect to the secondary part, a second current supply section for supplying one or more tilt-control currents to the one or more tilt-control windings of the linear electric machine, and a third controller section for controlling the one or more tilt-control currents in accordance with tilting information indicative of the angular deviation between the longitudinal direction of the primary part of the linear electric machine and the longitudinal direction of the secondary part of the linear electric machine.

The above-mentioned position information and the tilting information can be based on for example optical and/or inductive measurements.

In an exemplifying case where there are two primary sections in the primary part and two secondary sections in the secondary part, the secondary sections can be mechanically connected to each other for example so that the airgap surfaces of the secondary sections are facing towards opposite directions and the yoke portions of the secondary sections are towards each other. It is also possible that the primary sections are mechanically connected to each other so that the yoke portions of the primary sections are towards each other and the airgap surfaces of the primary sections are facing towards opposite directions. In the above-presented exemplifying cases, the resultant of the transversal magnetic forces acting on the primary sections can be controlled in one geometric dimension which is substantially perpendicular to the longitudinal direction of the linear electric machine. The direction and the strength of the resultant can be controlled by controlling a difference between currents supplied to the force-generating windings of the primary sections.

In an exemplifying case where there are three or more primary sections in the primary part and correspondingly three or more secondary sections in the secondary part, the secondary sections can be mechanically connected to each other so that the airgap surfaces of the secondary sections constitute substantially a regular polygon, e.g. an equilateral triangle or a square, when seen along the longitudinal direction of the secondary part. In this exemplifying case, the resultant of the transversal magnetic forces acting on the primary sections can be controlled in two geometric dimensions which are substantially perpendicular to the longitudinal direction of the linear electric machine.

It is, however, challenging to control the currents supplied to the force-generating windings so that, in addition to achieving a desired thrust force and a desired resultant of the transversal magnetic forces, tilting of the primary part with respect to the secondary part is kept within acceptable limits. In this document, the term "tilting" means an angular deviation between the longitudinal direction of the primary part and the longitudinal direction of the secondary part. The tilting can be controlled with the aid of the above-mentioned one or more tilt-control windings for generating the one or more transversal magnetic tilt-control forces acting on one or both of the end-regions of the primary part.

A linear electric drive according to the invention comprises a linear electric machine of the kind described above and a power electronic converter according to the invention for controlling the linear electric machine.

In accordance with the invention, there is provided also a new conveyor system that comprises:
a conveyor car,
a linear electric machine of the kind described above for moving the conveyor car, and
a power electronic converter according to the invention for controlling the linear electric machine.

The conveyor system can be, for example but not necessarily, an elevator where the movement of the conveyor car is substantially vertical.

Various exemplifying and non-limiting embodiments of the invention are described in accompanied dependent claims.

Various exemplifying and non-limiting embodiments of the invention both as to constructions and to methods of operation, together with additional objects and advantages thereof, will be best understood from the following description of specific exemplifying and non-limiting embodiments when read in conjunction with the accompanying drawings.

The verbs "to comprise" and "to include" are used in this document as open limitations that neither exclude nor require the existence of un-recited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF THE DRAWINGS

Exemplifying and non-limiting embodiments of the invention and their advantages are explained in greater detail below in the sense of examples and with reference to the accompanying drawings, in which.

DETAILED DESCRIPTION

The specific examples provided in the description given below should not be construed as limiting the scope and/or the applicability of the appended claims. Lists and groups of examples provided in the description given below are not exhaustive unless otherwise explicitly stated.

Figure 1A:
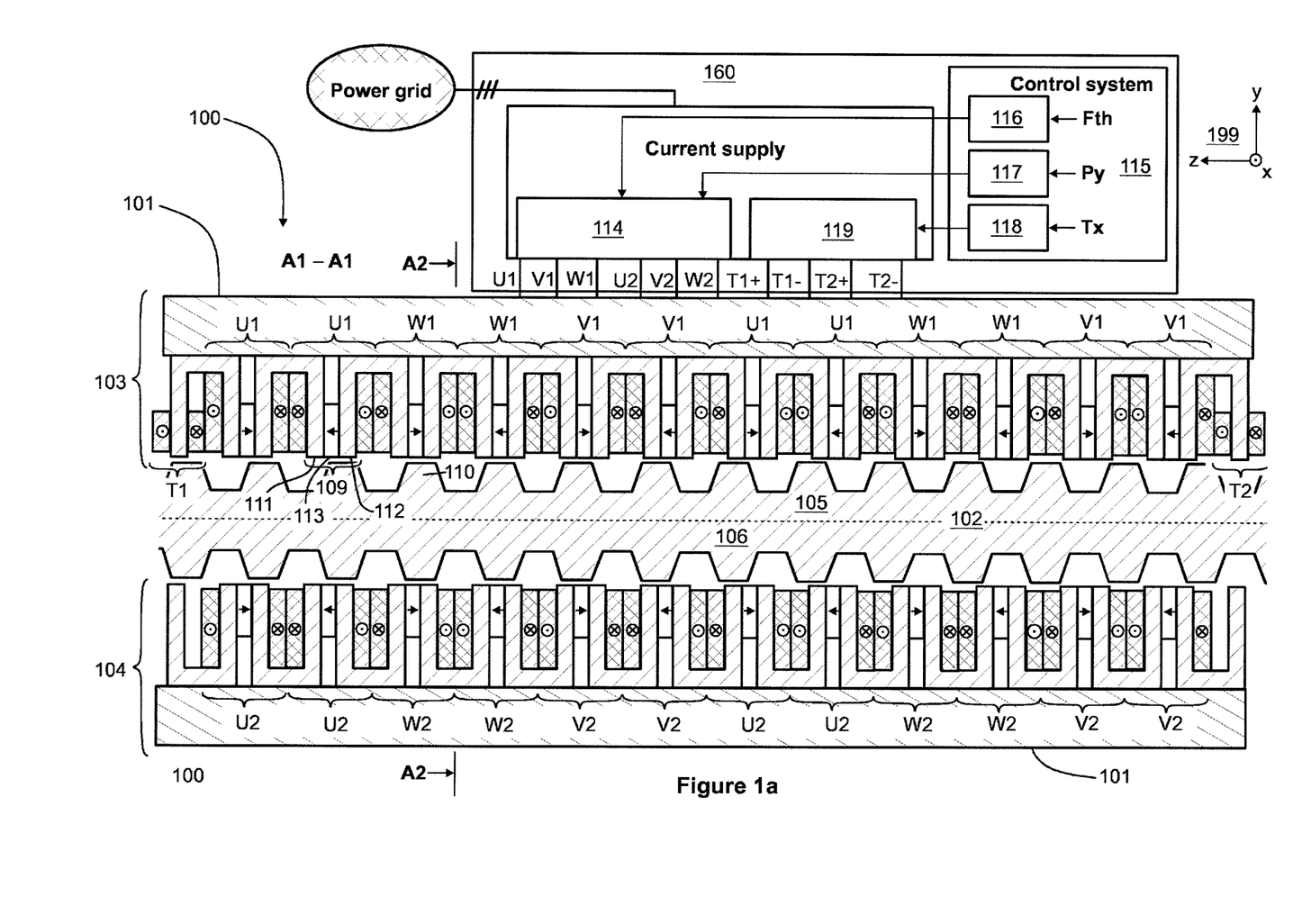
FIGS. 1a, 1b, 1c, 1d, and 1e illustrate a linear electric drive according to an exemplifying and non-limiting embodiment of the invention, and linear electric machines according to exemplifying and non-limiting embodiments of the invention.
Figure 1B:
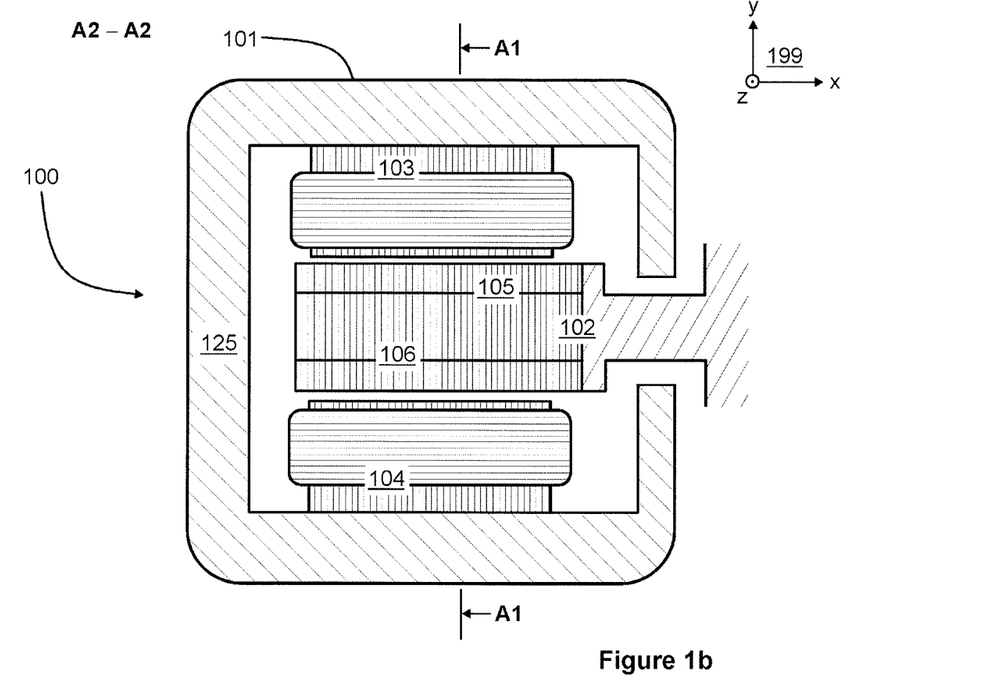

FIG. 1a shows a schematic illustration of a linear electric drive according to an exemplifying and non-limiting embodiment of the invention. The linear electric drive comprises a linear electric machine 100 which is shown as a section view in FIG. 1a. The section is taken along a line A1-A1 shown in FIG. 1b and the section plane is parallel with the yz-plane of a coordinate system 199. FIG. 1b shows a cross-section of the linear electric machine 100. The cross-section is taken along a line A2-A2 shown in FIG. 1a, and the section plane of the cross-section is parallel with the xy-plane of the coordinate system 199.

The linear electric machine 100 comprises a primary part 101 and a secondary part 102 which are linearly movable with respect to each other in the longitudinal direction of the linear electric machine 100. The longitudinal direction is parallel with the z-axis of the coordinate system 199. The primary part 101 comprises primary sections 103 and 104 each of which has an airgap surface. The secondary part 102 comprises secondary sections 105 and 106 each of which has an airgap surface that faces towards the air-gap surface of the respective one of the primary sections.

The primary section 103 comprises a force-generating three-phase winding U1, V1, and W1 for generating, when supplied with currents, a longitudinal magnetic thrust force and a transversal magnetic force. The longitudinal magnetic thrust force tends to move the primary part 101 longitudinally with respect to the secondary part 102, and the transversal magnetic force pulls the primary section 103 towards the respective secondary section 105. The longitudinal magnetic thrust force is substantially parallel with the z-axis of the coordinate system 199, and the transversal magnetic force is substantially parallel with the y-axis of the coordinate system 199. Correspondingly, the primary section 105 comprises a force-generating three-phase winding U2, V2, and W2 for generating, when supplied with currents, a longitudinal magnetic thrust force and a transversal magnetic force. The longitudinal magnetic thrust force tends to move the primary part 101 longitudinally with respect to the secondary part 102, and the transversal magnetic force pulls the primary section 104 towards the respective secondary section 106.

As illustrated in FIGS. 1a and 1b, the primary sections 103 and 104 are mechanically connected to each other and the secondary sections 105 and 106 are mechanically connected to each other so that the transversal magnetic forces acting on the primary sections 103 and 104 are controllable to cancel each other, to form a resultant having substantially the positive y-direction of the coordinate system 199, or to form a resultant having substantially the negative y-direction of the coordinate system 199. Thus, the resultant is controllable in one geometric dimension which is substantially parallel with the y-axis of the coordinate system 199. As illustrated in FIG. 1b, the primary sections 103 and 104 are mechanically connected to each other with the aid of a frame structure 125. The secondary sections 105 and 106 are mechanically connected to each other so that the airgap surfaces of the secondary sections are facing towards opposite directions and the yoke portions of the secondary sections are towards each other. In this exemplifying case, the secondary part 102 is a single mechanical structure which constitutes both of the secondary sections 105 and 106. Thus, there is only a logical boundary between the yoke portions of the secondary sections 105 and 106. The secondary part 102 can comprise for example electrically insulated ferromagnetic sheets which are stacked on each other in the x-direction of the coordinate system 199.

The primary part 101 comprises, at a first end-region of the primary part, a first tilt-control winding T1 for generating, when supplied with a first tilt-control current, a first transversal magnetic tilt-control force acting on the first end-region of the primary part. The primary part 101 comprises, at the second end-region of the primary part, a second tilt-control winding T2 for generating, when supplied with a second tilt-control current, a second transversal magnetic tilt-control force acting on the second end-region of the primary part. The first and second transversal magnetic tilt-control forces acting on the primary section 103 have substantially the negative y-direction of the coordinate system 199. An angular deviation between the longitudinal direction of the primary part 101 and the longitudinal direction of the secondary part 102, i.e. the tilting of the primary part 101 with respect to the secondary part 102, can be controlled by controlling the difference between the first and second tilt-control forces.

The exemplifying linear electric machine illustrated in FIGS. 1a and 1b is a switched flux linear electric machine where each of the primary sections 103 and 104 comprises primary section teeth pitched at uniform first intervals, the coil width of the force-generating windings U1, V1, W1, U2, V2, W2 equals to the first interval, and each of the secondary sections comprises secondary section teeth pitched at uniform second intervals different from the first intervals. In FIG. 1a, one of the primary section teeth is denoted with a reference 109 and one of the secondary section teeth is denoted with a reference 110. Each primary section tooth which is surrounded by a coil of the force-generating windings comprises two portions successively in the longitudinal direction of the primary part 101 and a permanent magnet located in a gap between the two portions. In FIG. 1a, the two portions of the primary section tooth 109 are denoted with references 111 and 112 and the permanent magnet located in the gap between the portions 111 and 112 is denoted with a reference 113. The magnetization direction of each permanent magnet is parallel with the longitudinal direction of the primary part 101 so that the magnetization directions of permanent magnets located in adjacent ones of the primary section teeth are opposite to each other. In FIG. 1a, the magnetization directions of the permanent magnets are depicted with arrows. In a linear electric machine according to an exemplifying and non-limiting embodiment of the invention, the primary sections 103 and 104 are shifted with respect to each other in the longitudinal direction, i.e. in the z-direction of the coordinate system 199, in order to smooth the magnetic thrust force, i.e. to reduce undulation of the magnetic thrust force.

Figure 1C:
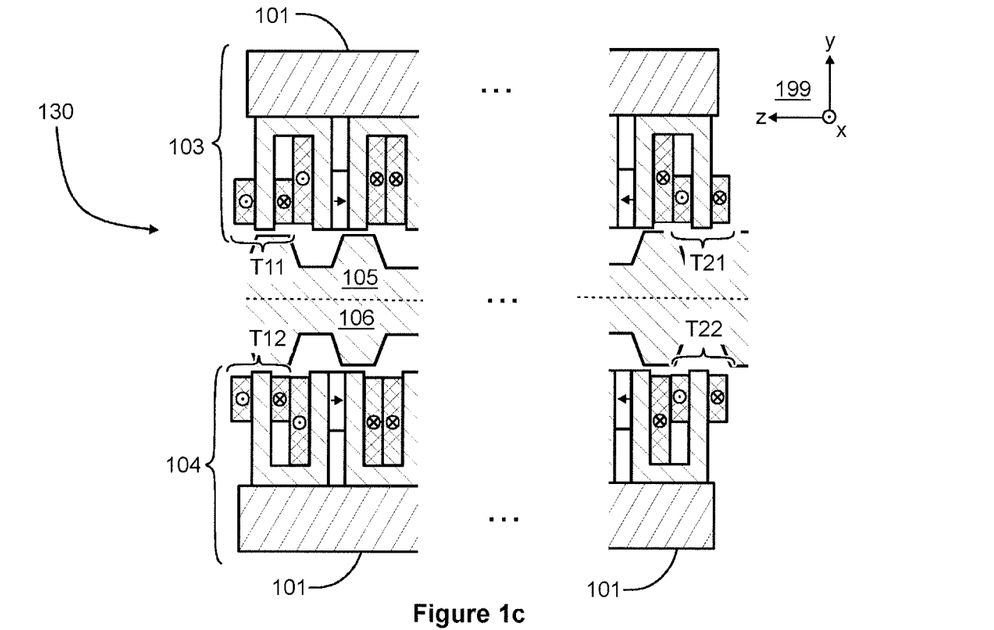

FIG. 1c illustrates a linear electric machine 130 according to an exemplifying and non-limiting embodiment of the invention. FIG. 1c shows the end-regions of the primary part 101 of the linear electric machine 130. The linear electric machine 130 can be otherwise similar to the linear electric machine 100 illustrated in FIGS. 1a and 1b but the linear electric machine 130 comprises tilt-control windings in both of the primary sections 103 and 104. The primary section 103 comprises a tilt-control winding T11 at the first end-region and a tilt-control winding T21 at the second end-region. The primary section 104 comprises a tilt-control winding T12 at the first end-region and a tilt-control winding T22 at the second end-region.

Figure 1D:
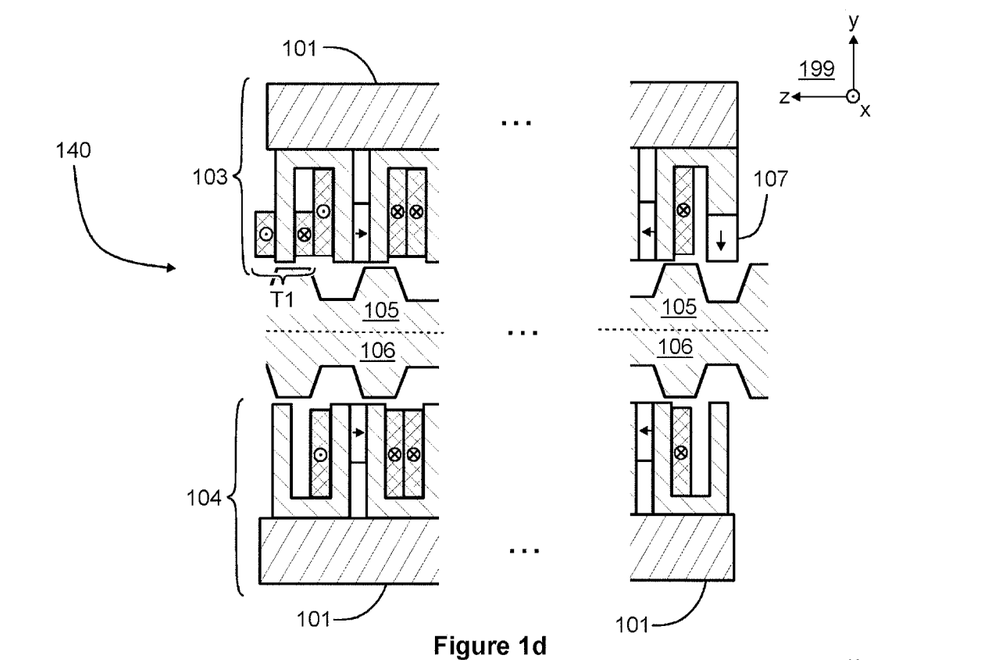

FIG. 1d illustrates a linear electric machine 140 according to an exemplifying and non-limiting embodiment of the invention. FIG. 1d shows the end-regions of the primary part 101 of the linear electric machine 140. The linear electric machine 140 can be otherwise similar to the linear electric machine 100 illustrated in FIGS. 1a and 1b but the primary section 103 of the linear electric machine 140 comprises a tilt-control winding T1 only at the first end-region of the primary part 101. The primary section 103 comprises, at the second end-region of the primary part 101, a permanent magnet 107 for generating a transversal magnetic force that acts, when controlling the tilting of the primary part 101, as a counterforce for the transversal magnetic tilt-control force generated with the tilt-control winding T1. The counterforce is needed because the magnetic tilt-control force generated with the tilt-control winding T1 can only pull the first end-region of the primary section 103 towards the secondary section 105 but not push the first end-region of the primary section 103 away from secondary section 105.

Figure 1E:
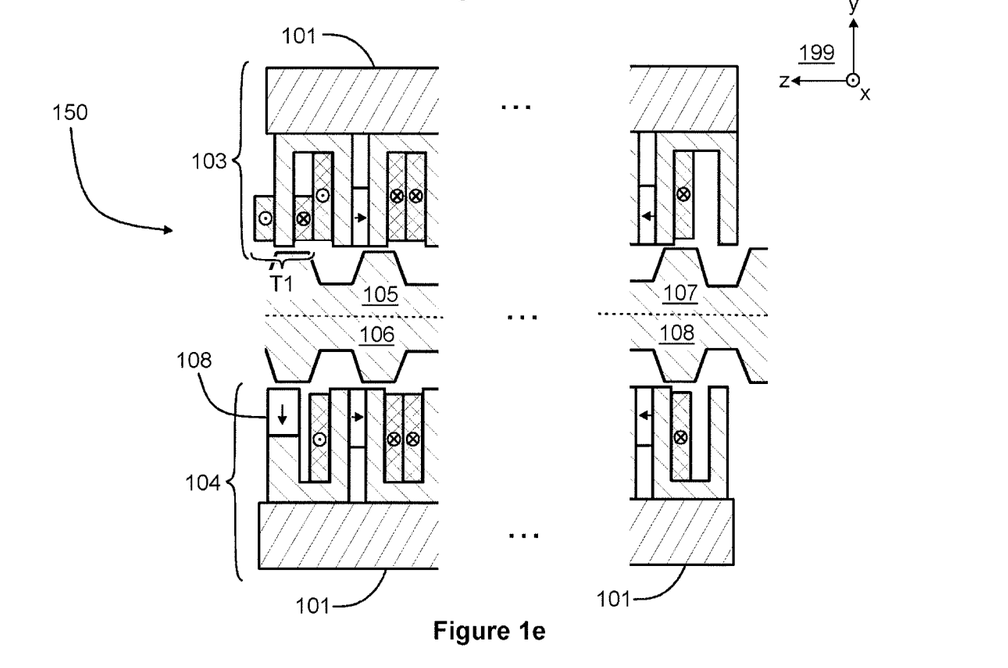

FIG. 1e illustrates a linear electric machine 150 according to an exemplifying and non-limiting embodiment of the invention. FIG. 1e shows the end-regions of the primary part 101 of the linear electric machine 150. The linear electric machine 150 can be otherwise similar to the linear electric machine 100 illustrated in FIGS. 1a and 1b but primary section 103 of the linear electric machine 150 comprises a tilt-control winding T1 only at the first end-region of the primary part 101. The primary section 104 comprises, at the first end-region of the primary part 101, a permanent magnet 108 for generating a transversal magnetic force that acts, when controlling the tilting of the primary part 101, as a counterforce for the transversal magnetic tilt-control force generated with the tilt-control winding T1.

The exemplifying linear electric drive illustrated in FIG. 1a further comprises a power electronic converter 160 for controlling the linear electric machine 100. The power electronic converter 160 comprises a first current supply section 114 for supplying force-generating currents to the force-generating windings U1, V1, W1, U2, V2, W2 of the linear electric machine 100. The power electronic converter 160 comprises a second current supply section 119 for supplying tilt-control currents to the tilt-control windings T1 and T2 of the linear electric machine. The current supply section 114 may comprise for example a frequency converter for supplying the force-generating currents. The current supply section 119 may comprise for example controllable direct voltage sources for supplying the tilt-control currents. The power electronic converter 160 comprises a control system 115 for controlling the first and second current supply sections 114 and 119. The control system 115 comprises a first controller section 116 for controlling the force-generating currents in accordance with control information related to a longitudinal magnetic thrust force to be generated by the linear electric machine 100. The control system 115 comprises a second controller section 117 for controlling differences of the force-generating currents related to the primary sections 103 and 104 in accordance with position information indicative of the y-directional position of the primary part 101 with respect to the secondary part 102 so as to magnetically levitate the primary part with respect to the secondary part. The control system 115 comprises a third controller section 118 for controlling the tilt-control currents in accordance with tilting information indicative of the angular deviation between the longitudinal direction of the primary part 101 and the longitudinal direction of the secondary part 102. The above-mentioned position information and the tilting information can be based on for example optical and/or inductive measurements.

The control system 115 can be implemented with one or more processor circuits each of which can be a programmable processor circuit provided with appropriate software, a dedicated hardware processor such as for example an application specific integrated circuit "ASIC", or a configurable hardware processor such as for example a field programmable gate array "FPGA". Furthermore, the control system 115 may comprise one or more memory circuits each of which can be a random-access memory "RAM".

Figure 2:
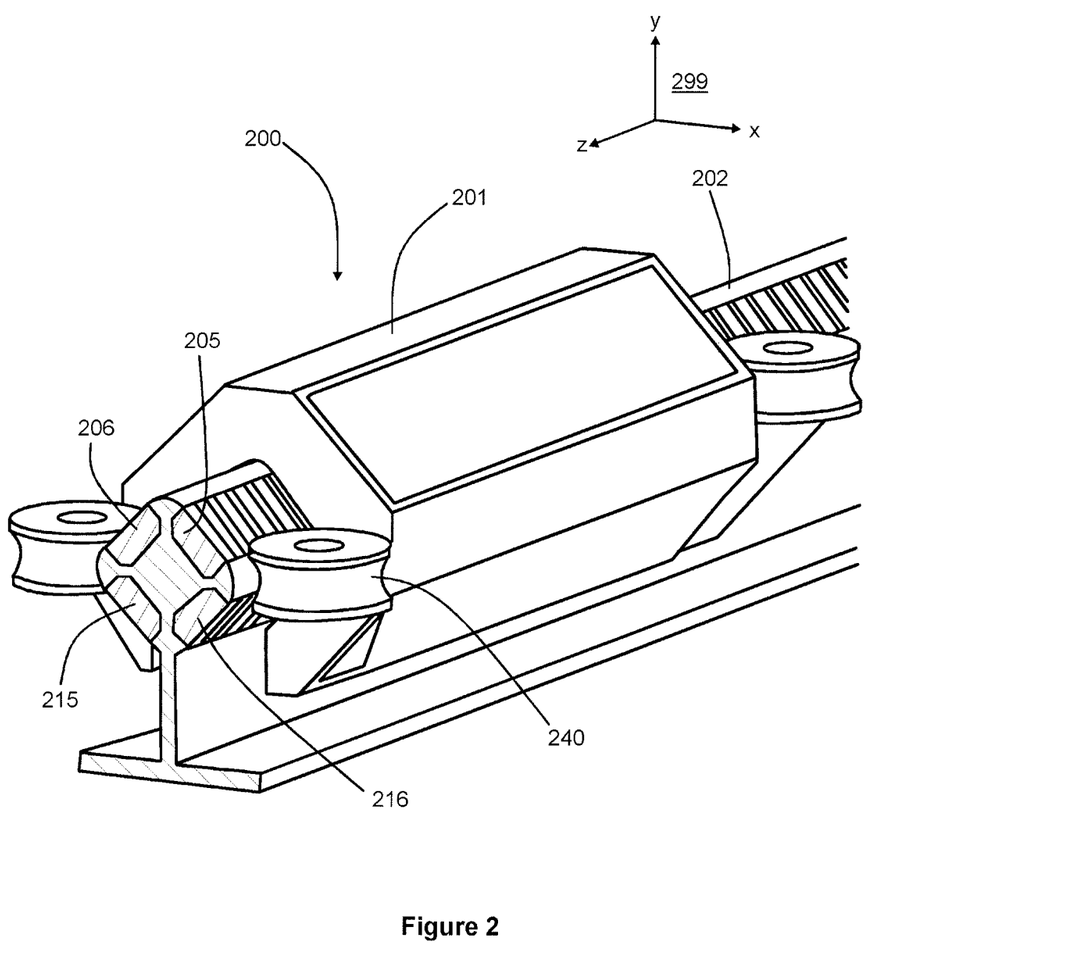
FIG. 2 illustrates a linear electric machine of a linear electric drive according to an exemplifying and non-limiting embodiment of the invention.

FIG. 2 illustrates a linear electric machine 200 of a linear electric drive according to an exemplifying and non-limiting embodiment of the invention. The linear electric machine 200 comprises a primary part 201 and a secondary part 202 which are linearly movable with respect to each other in directions parallel with the z-axis of a coordinate system 299. The primary part 201 comprises primary sections each having an airgap surface. The secondary part 202 comprises secondary sections 205, 206, 215, and 216 each having an airgap surface facing towards the air-gap surface of the respective one of the primary sections. Each primary section comprises force-generating windings for generating a longitudinal magnetic thrust force tending to move the primary part 201 longitudinally with respect to the secondary part 202, and a transversal magnetic force pulling the primary section under consideration towards the respective one of the secondary sections. The primary sections are mechanically connected to each other and the secondary sections 205, 206, 215, and 216 are mechanically connected to each other so that the resultant of the transversal magnetic forces acting on the primary sections is controllable to be zero or to have a desired direction and a desired strength in the xy-plane of the coordinate system 299. The primary part 201 comprises, at one or both end-regions of the primary part 201, one or more tilt-control windings for controlling an angular deviation between the longitudinal direction of the primary part 201 and the longitudinal direction of the secondary part 202. The primary sections are not shown in FIG. 2 but each primary section can be for example similar to the primary section 103 shown in FIG. 1a. The one or more tilt-control windings are not shown in FIG. 2 but the one or more tilt-control windings can be according to what is presented in FIG. 1a, 1c, 1d, or 1e. The exemplifying linear electric machine 200 shown in FIG. 2 further comprises safety wheels for supporting the primary part 201 with respect to the secondary part 202 in situations in which the magnetic levitation is not operating. In FIG. 2, one of the safety wheels is denoted with a reference 240.

In the exemplifying linear electric drive illustrated in FIG. 2, the secondary sections 205, 206, 216, and 216 are mechanically connected to each other so that the airgap surfaces of the secondary sections constitute substantially a square when seen along the longitudinal direction of the secondary part 201, i.e. along a geometric line parallel with the z-axis of the coordinate system 299. In cases where the number of the secondary sections is at least three, the secondary sections can be mechanically connected to each other so that the airgap surfaces of the secondary sections constitute substantially a regular polygon when seen along the longitudinal direction of the secondary part.

Figure 3:
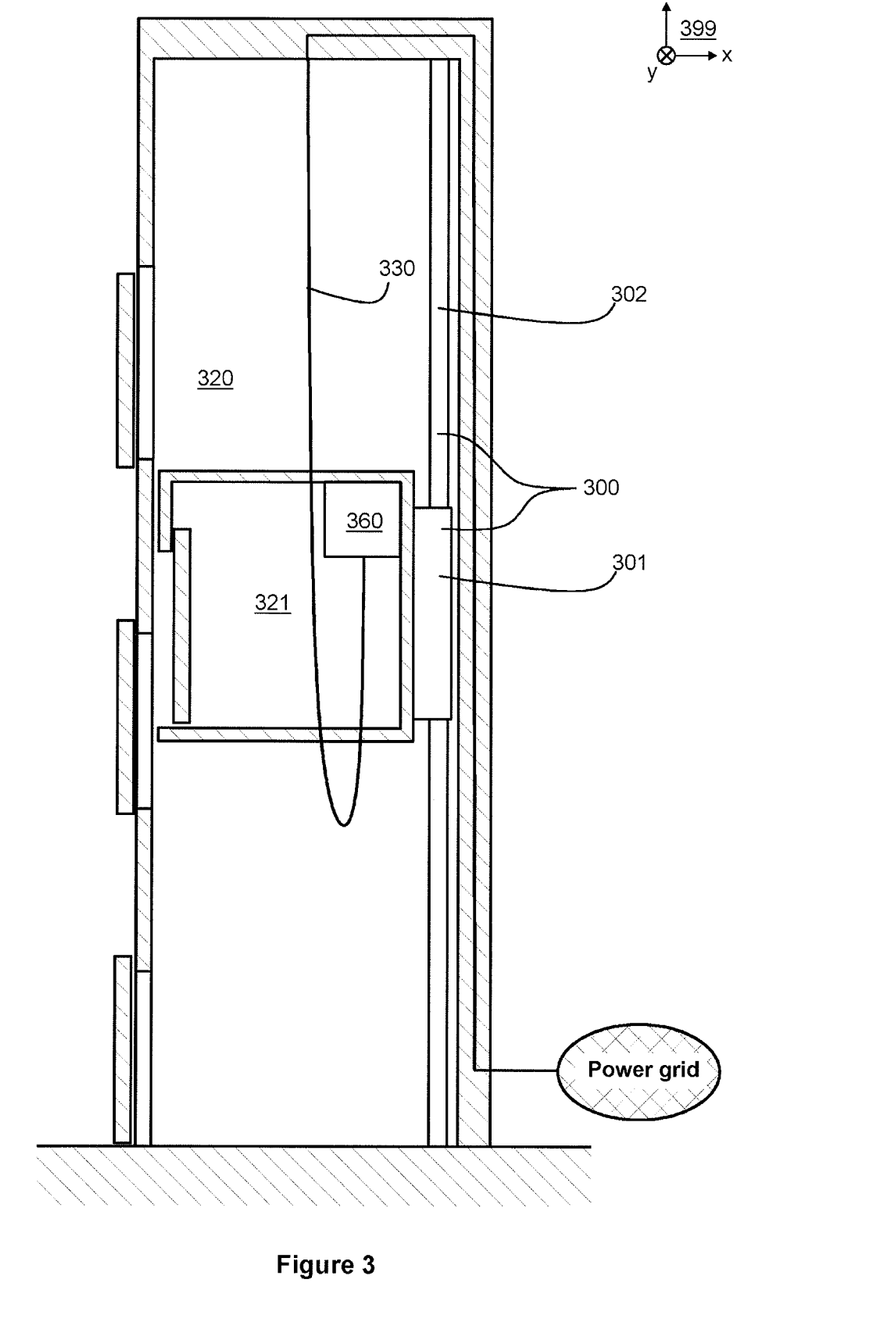
FIG. 3 shows a schematic illustration of a conveyor system according to an exemplifying and non-limiting embodiment of the invention.

FIG. 3 shows a schematic section view of a conveyor system according to an exemplifying and non-limiting embodiment of the invention. The section plane is parallel with the xz-plane of a coordinate system 399. In this exemplifying case, the conveyor system is an elevator that comprises a substantially vertical conveyor shaft 320 that can be for example a part of a building e.g. a block of flats. The conveyor system comprises a conveyor car 321 movable in the conveyor shaft 320 that represents a mechanical structure defining a moving path of the conveyor car 321. The conveyor system comprises a linear electric machine 300 according to an embodiment of the invention for moving the conveyor car 321. The conveyor system comprises a power electronic converter 360 according an embodiment of the invention for controlling the linear electric machine 300. The linear electric machine 300 comprises a primary part 301 which comprises force-generating windings and one or more tilt-control windings of the kind described above with reference to FIGS. 1a-1e. The linear electric machine 300 comprises a secondary part 302 with respect to which the primary part 301 is movable in the vertical directions. In this exemplifying conveyor system, the primary part 301 of the linear electric machine 300 is attached to the conveyor car 321 and the secondary part 302 is attached to conveyor shaft 320. The exemplifying conveyor system illustrated in FIG. 3 comprises a flexible cable 330 for supplying electric energy to the power electronic converter 360. It is also possible that the conveyor shaft 320 is provided with vertical conductor rails and the conveyor car 321 is provided with trolleys for receiving or supplying electric energy from or to the vertical conductor rails depending on whether the linear electric machine 300 acts as a linear motor or as a linear generator.

The specific examples provided in the description given above should not be construed as limiting the applicability and/or the interpretation of the appended claims. Lists and groups of examples provided in the description given above are not exhaustive unless otherwise explicitly stated.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A power electronic converter for controlling a linear electric machine that comprises a primary part and a secondary part which are linearly movable with respect to each other, wherein the primary part comprises primary sections each having an airgap surface, the secondary part comprises secondary sections each having an airgap surface facing towards the air-gap surface of a respective one of the primary sections, each primary section comprises force-generating windings for generating a longitudinal magnetic thrust force tending to move the primary part longitudinally with respect to the secondary part and a transversal magnetic force pulling the primary section towards a respective one of the secondary sections, the primary sections are mechanically connected to each other and the secondary sections are mechanically connected to each other so that the transversal magnetic forces acting on the primary sections are controllable to cancel each other, and the primary part comprises, at least at a first end-region of the primary part, one or more tilt-control windings for generating one or more transversal magnetic tilt-control forces so as to control an angular deviation between a longitudinal direction of the primary part and a longitudinal direction of the secondary part, the power electronic converter comprising:
   a first current supply section for supplying force-generating currents to the force-generating windings of the linear electric machine,
   a first controller section for controlling the force-generating currents in accordance with control information related to a longitudinal magnetic thrust force to be generated by the linear electric machine, and
   a second controller section for controlling differences of the force-generating currents related to different ones of the primary sections in accordance with position information indicative of a transversal position of the primary part of the linear electric machine with respect to the secondary part of the linear electric machine so as to magnetically levitate the primary part with respect to the secondary part,
wherein the power electronic converter further comprises:
   a second current supply section for supplying one or more tilt-control currents to the one or more tilt-control windings of the linear electric machine, and
   a third controller section for controlling the one or more tilt-control currents in accordance with tilting information indicative of the angular deviation between the longitudinal direction of the primary part of the linear electric machine and the longitudinal direction of the secondary part of the linear electric machine.

2. A linear electric drive comprising a linear electric machine and a power electronic converter according to claim 1 for controlling the linear electric machine, the linear electric machine comprising a primary part and a secondary part which are linearly movable with respect to each other, wherein the primary part comprises primary sections each having an airgap surface, the secondary part comprises secondary sections each having an airgap surface facing towards the air-gap surface of a respective one of the primary sections, each primary section comprises force-generating windings for generating a longitudinal magnetic thrust force tending to move the primary part longitudinally with respect to the secondary part and a transversal magnetic force pulling the primary section towards a respective one of the secondary sections, the primary sections are mechanically connected to each other and the secondary sections are mechanically connected to each other so that the transversal magnetic forces acting on the primary sections are controllable to cancel each other, and the primary part comprises, at least at a first end-region of the primary part, one or more tilt-control windings for generating one or more transversal magnetic tilt-control forces so as to control an angular deviation between a longitudinal direction of the primary part and a longitudinal direction of the secondary part.

3. The linear electric drive according to claim 2, wherein the primary part comprises, at a second end-region of the primary part, one or more other tilt-control windings for generating one or more other transversal magnetic tilt-control forces.

4. The linear electric drive according to claim 3, wherein the primary part comprises, at a second end-region of the primary part, a permanent magnet for generating a transversal magnetic force for acting, when controlling the angular deviation, against the transversal magnetic tilt-control force generated with the tilt-control winding at the first end-region of the primary part.

5. The linear electric drive according to claim 3, wherein the primary part comprises, at the first end-region of the primary part, a permanent magnet for generating a transversal magnetic force for acting, when controlling the angular deviation, against the transversal magnetic tilt-control force generated with the tilt-control winding at the first end-region of the primary part.

6. The linear electric drive according to claim 3, wherein the secondary sections are mechanically connected to each other so that the airgap surfaces of the secondary sections are facing towards opposite directions and yoke portions of the secondary sections are towards each other.

7. The linear electric drive according to claim 3, wherein the secondary sections are mechanically connected to each other so that the airgap surfaces of the secondary sections constitute substantially a regular polygon when seen along the longitudinal direction of the secondary part.

8. The linear electric drive according to claim 2, wherein the primary part comprises, at a second end-region of the primary part, a permanent magnet for generating a transversal magnetic force for acting, when controlling the angular deviation, against the transversal magnetic tilt-control force generated with the tilt-control winding at the first end-region of the primary part.

9. The linear electric drive according to claim 8, wherein the primary part comprises, at the first end-region of the primary part, a permanent magnet for generating a transversal magnetic force for acting, when controlling the angular deviation, against the transversal magnetic tilt-control force generated with the tilt-control winding at the first end-region of the primary part.

10. The linear electric drive according to claim 8, wherein the secondary sections are mechanically connected to each other so that the airgap surfaces of the secondary sections are facing towards opposite directions and yoke portions of the secondary sections are towards each other.

11. The linear electric drive according to claim 2, wherein the primary part comprises, at the first end-region of the primary part, a permanent magnet for generating a transversal magnetic force for acting, when controlling the angular deviation, against the transversal magnetic tilt-control force generated with the tilt-control winding at the first end-region of the primary part.

12. The linear electric drive according to claim 11, wherein the secondary sections are mechanically connected to each other so that the airgap surfaces of the secondary sections are facing towards opposite directions and yoke portions of the secondary sections are towards each other.

13. The linear electric drive according to claim 2, wherein the secondary sections are mechanically connected to each other so that the airgap surfaces of the secondary sections are facing towards opposite directions and yoke portions of the secondary sections are towards each other.

14. The linear electric drive according to claim 2, wherein the secondary sections are mechanically connected to each other so that the airgap surfaces of the secondary sections constitute substantially a regular polygon when seen along the longitudinal direction of the secondary part.

15. The linear electric drive according to claim 14, wherein the secondary sections are mechanically connected to each other so that the airgap surfaces of the secondary sections constitute substantially a square when seen along the longitudinal direction of the secondary part.

16. The linear electric drive according to claim 2, wherein the linear electric machine is a switched flux linear electric machine where each primary section comprises primary section teeth pitched at uniform first intervals, a coil width of the force-generating windings equals to the first intervals, and each secondary section comprises secondary section teeth pitched at uniform second intervals different from the first intervals.

17. The linear electric drive according to claim 16, wherein each primary section tooth which is surrounded by a coil of the force-generating windings comprises two portions successively in the longitudinal direction of the primary part and a permanent magnet located in a gap between the two portions, magnetization directions of the permanent magnets being parallel with the longitudinal direction of the primary part and the permanent magnets of adjacent ones of the primary section teeth having magnetization directions opposite to each other.

18. A conveyor system comprising:
a conveyor car,
a linear electric machine for moving the conveyor car, and
a power electronic converter according to claim 1 for controlling the linear electric machine, wherein the linear electric machine comprises a primary part and a secondary part which are linearly movable with respect to each other, wherein the primary part comprises primary sections each having an airgap surface, the secondary part comprises secondary sections each having an airgap surface facing towards the air-gap surface of a respective one of the primary sections, each primary section comprises force-generating windings for generating a longitudinal magnetic thrust force tending to move the primary part longitudinally with respect to the secondary part and a transversal magnetic force pulling the primary section towards a respective one of the secondary sections, the primary sections are mechanically connected to each other and the secondary sections are mechanically connected to each other so that the transversal magnetic forces acting on the primary sections are controllable to cancel each other, and the primary part comprises, at least at a first end-region of the primary part, one or more tilt-control windings for generating one or more transversal magnetic tilt-control forces so as to control an angular deviation between a longitudinal direction of the primary part and a longitudinal direction of the secondary part.

19. The conveyor system according to claim 18, wherein the primary part of the linear electric machine is attached to the conveyor car and the secondary part of the linear electric machine is attached to a mechanical structure defining a moving path of the conveyor car.

20. The conveyor system according to claim 18, wherein the conveyor system is an elevator where the movement of the conveyor car is substantially vertical.

* * * * *